US007139595B2

(12) United States Patent
Lane

(10) Patent No.: US 7,139,595 B2
(45) Date of Patent: Nov. 21, 2006

(54) TRANSIT VEHICLE WIRELESS TRANSMISSION BROADCAST SYSTEM

(75) Inventor: David E. Lane, New York, NY (US)

(73) Assignee: The Rail Network, Inc., New York, NY (US)

( * ) Notice: Subject to any disclaimer, the term of this patent is extended or adjusted under 35 U.S.C. 154(b) by 460 days.

(21) Appl. No.: 10/279,444

(22) Filed: Oct. 24, 2002

(65) Prior Publication Data

US 2004/0198281 A1 Oct. 7, 2004

(51) Int. Cl.
*H04M 1/00* (2006.01)

(52) U.S. Cl. ..................... 455/569.2; 455/99; 455/517; 455/345

(58) Field of Classification Search ................ 455/517, 455/520, 414.1, 466, 99, 569.2, 345; 725/74–76, 725/81
See application file for complete search history.

(56) References Cited

U.S. PATENT DOCUMENTS 5,732,216 A 3/1998 Logan et al.
6,144,900 A 11/2000 Ali et al.
6,173,399 B1 1/2001 Gilbrech
6,223,027 B1 * 4/2001 Ono et al. ............... 455/412.1
6,356,822 B1 3/2002 Diaz et al.
6,407,673 B1 6/2002 Lane
6,751,442 B1 * 6/2004 Barrett ...................... 455/11.1
2001/0021654 A1 * 9/2001 Spratt et al. ................ 455/500
2001/0048749 A1 * 12/2001 Ohmura et al. ............... 381/86
2002/0027495 A1 * 3/2002 Darby et al. ................ 340/298
2002/0049520 A1 4/2002 Mays
2002/0170060 A1 * 11/2002 Lyman ........................ 725/73
2003/0045265 A1 * 3/2003 Huang et al. ............... 455/355
2003/0151520 A1 * 8/2003 Kraeling et al. ....... 340/825.72
2003/0217363 A1 * 11/2003 Brady et al. .................. 725/76
2003/0223387 A1 * 12/2003 Davenport et al. ......... 370/328
2004/0058656 A1 * 3/2004 Chikaishi .................... 455/130
2004/0066786 A1 * 4/2004 Catterall et al. ............ 370/400
2004/0104312 A1 * 6/2004 Hess et al. .................. 246/186
2005/0039208 A1 * 2/2005 Veeck et al. .................. 725/76
2005/0170791 A1 * 8/2005 Tabata et al. .............. 455/90.3

FOREIGN PATENT DOCUMENTS

EP 0 357 963 B1 1/1995
GB 2306857 A 5/1997
WO WO 01/03075 A1 1/2001
WO WO 01/27829 A1 4/2001
WO WO 01/37517 A2 5/2001

OTHER PUBLICATIONS

Japanese Publication No. 01138916-JP, Takahashi, Toru, *Information Communication System of Train*, May 22, 2001.

* cited by examiner

*Primary Examiner*—Duc M. Nguyen
*Assistant Examiner*—Dai Phuong
(74) *Attorney, Agent, or Firm*—Patton Boggs LLP

(57) ABSTRACT

A transit vehicle wireless transmission broadcast system for wirelessly transmitting multimedia content from one transit vehicle to another transit vehicle for broadcast of the multimedia content to passengers traveling in the transit vehicles. Each transit vehicle includes a receiver for receiving the multimedia content or storage device for retrieving the multimedia content and a transmitter for wirelessly transmitting the multimedia content to a receiver located on another transit vehicle. Each of the transit vehicles includes broadcast device for broadcasting the multimedia content to the passengers.

2 Claims, 10 Drawing Sheets

TRANSIT VEHICLE WIRELESS TRANSMISSION BROADCAST SYSTEM

FIELD OF THE INVENTION

This invention relates to transit vehicle broadcast and more particularly, to a system and method for wirelessly transmitting multimedia content between two or more transit vehicles for broadcasting the multimedia content to passengers traveling in the transit vehicles.

PROBLEM

It is a problem in the field of broadcast systems to provide multimedia content to a plurality of passengers traveling in transit vehicles having a plurality of interconnected cars while also distributing the multimedia content to each of the interconnected cars. Typical transit vehicles having two or more cars are interconnected physically and electrically. The physical connection retains each next adjacent car connected to the previous car. One car on the transit vehicle may include a generator for providing electricity to the interconnected cars. A connector located at one end of each car connects to a mating connector located on the next adjacent car, thus providing electricity to each one of the two or more cars. However, a problem arises when a spare connection within the connector and corresponding mating connector is not available for use distributing multimedia content between the cars for broadcast to passengers traveling in the cars.

A typical solution is installation of a storage device in each one of the cars and connection of each storage device to a video graphic display for broadcasting the stored multimedia content to the passengers traveling in the car. Use of a plurality of storage devices requires multimedia to be downloaded to each storage device individually. Furthermore, each storage device is individually controlled, therefore the multimedia content broadcast to the passengers is not synchronized and the multimedia content retrieved from one storage device may vary from the multimedia content broadcast from another storage device located in another car.

Another solution may be the addition of another set of connectors for distributing multimedia content between the interconnected cars. However, addition of another connector requires existing cars in the field to be rewired. Adding additional wiring to existing cars which requires the two mating connected to automatically connect when the vehicles are attached increases the cost of installing the broadcast system on the transit vehicle since the connects requires both a physical and electrical connection.

Wireless transmission between interconnected cars is known for transmitting operational characteristics (U.S. patent application, Publication Number 20020049520 A1) in a daisy-chain fashion along a number of interconnected cars comprising the transit vehicle. A master controller within one of the cars serves as an interface with an external system for providing real-time data to a control site. The data provided to the control site may include sensor information, railcar identification, status, trouble spots, locations and warning. Another known system which wirelessly transmits the control data is disclosed in a patent application filed in Japan, Publication Number 01138916 JP. Pub. No. 01138916 JP discloses a system which includes a receiver and a transmitter at each of the front end and the read end for transmitting control data about each car to a host computer where the information is collected and managed. The information collected and managed is not distributed between the cars for broadcast to the passengers.

A known broadcast system is disclosed in U.S. Pat. No. 6,356,822, issued to Diaz et al. includes a multi-functional antenna on the vehicle for communicating with the vehicle to provide information for and about the vehicle's operational status and coordinating the vehicles activities. The system antenna also receives traditional broadcast such as AM/FM radio and television signals, transmit and receive citizens band (CB) radio signals, satellite and microwave and cellular telephone communications. While the system disclosed in Diaz et al. may broadcast the received audio and/or video to the passengers traveling in the vehicle, the system requires the vehicle to travel in areas where traditional broadcast is available. When the vehicle travels outside of the area where traditional broadcast is available, audio and or video signals are not received and therefore, the broadcast to the passengers ceases.

U.S. Pat. No. 6,144,900 issued to Ali et al., discloses a system for automatic serialization of an array of wireless nodes for determining the sequence of cars in a train. In this system, each car is equipped with a wireless communication device that requires no physical connection to the next. Each car forwards the wave pattern received from the adjacent car to the next adjacent car until the wave pattern is received by the head-end unit where the head-end unit constructs a train map which is the sequence of the cars. Another system for determining the position of vehicles in a convoy of vehicles is disclosed in German Patent Number EP0357963 issued to Bragas et al., where each vehicle in the convoy includes a transmitter and receiver for transmission of carrier modulated by data for determining the position of each vehicle in the convoy.

While these systems provide wireless transmission from one vehicle to the next, the systems do not provide for transmission of multimedia content for broadcast to the passengers traveling in the vehicles in areas where traditional broadcast is lacking or not available. The wireless transmission is limited in function to conveying the received wireless position or control data transmission to a next adjacent vehicle and is not directly linked to any broadcast system within the vehicle.

For these reasons, a need exists for a system for wirelessly distributing multimedia content to a plurality of interconnected cars with devices located in each car for broadcasting the received multimedia content to the passengers traveling in the car.

SOLUTION

A transit vehicle wireless transmission broadcast system for wirelessly transmitting multi-media content from one car of a transit vehicle to another car for broadcast of the multimedia content to passengers traveling in the cars. Each transit vehicle includes a receiver for receiving the multimedia content or a storage device for retrieving the multimedia content and a transmitter for transmitting the multimedia content to a receiver located on the car. Prior to transmitting, the multimedia content may be converted to a wireless frequency and may be amplified for transmission. Each of the transit vehicles includes at least one broadcast device for broadcasting the multimedia content to the passengers traveling within the corresponding car.

Each transit vehicle may include a converter for converting the received multimedia content for display on one or more video graphic display devices or wirelessly transmitted within the transit vehicle for receipt by hand held devices that are capable of receiving the transmitted wireless multimedia content and are in the possession of passengers.

DETAILED DESCRIPTION

The transit vehicle wireless transmission system summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

A typical broadcast system for transit vehicles having multiple interconnected cars includes a storage device located in each vehicle connect to a closed circuit audio and/or audio/video system for broadcast of content to the passengers traveling in the corresponding car. Referring to the block schematic diagram of FIG. 1, for purpose of illustration and discussion, the present transit vehicle wireless transmission broadcast system may include at least one storage device 12 for storing multimedia content for broadcast to passengers traveling in the transit vehicle. Alternatively, the multimedia content may be downloaded to the car and distributed to another car and broadcast to the passengers as the multimedia content is received.

Figure 1:
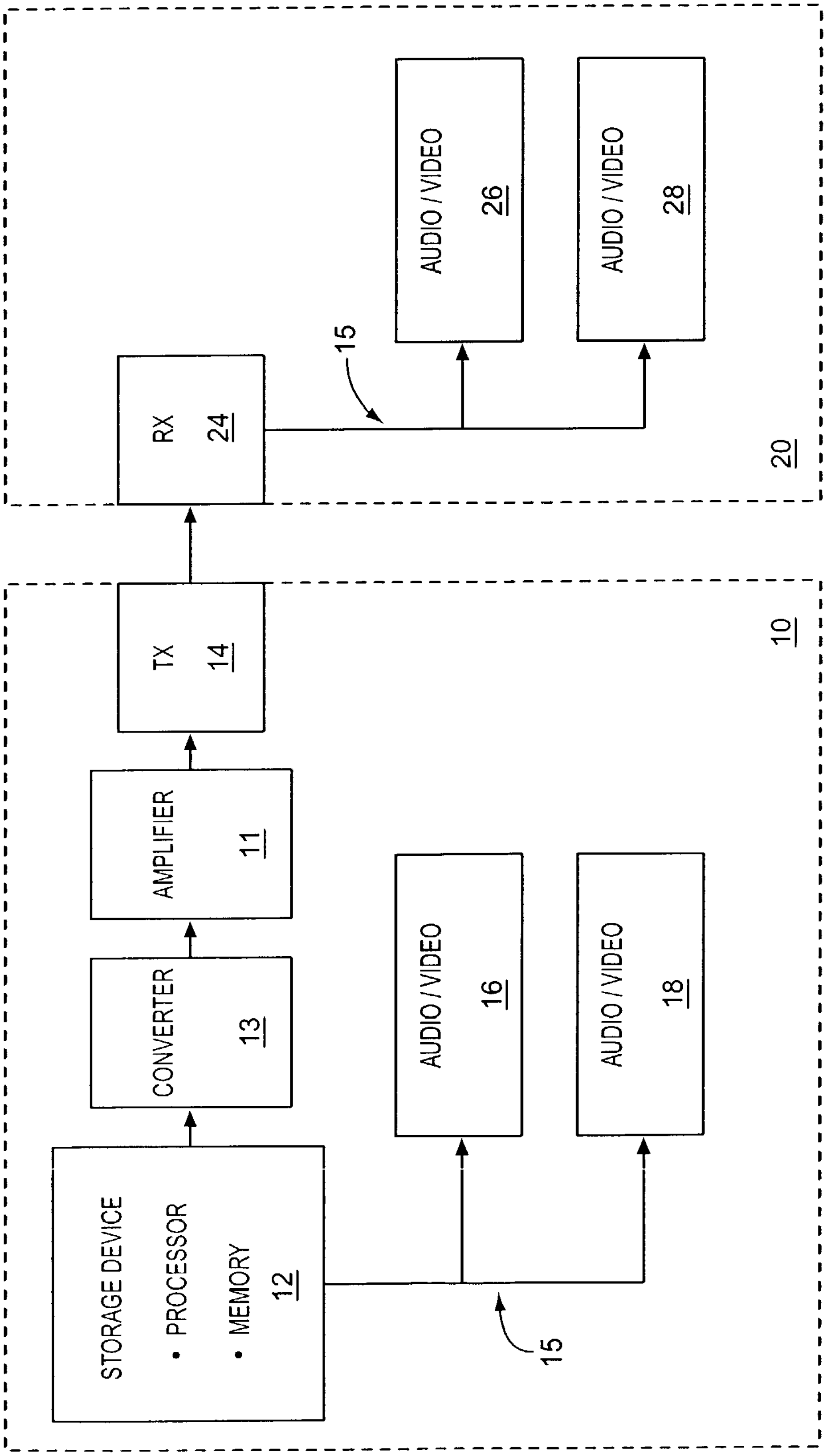
FIG. 1 illustrates in block diagram form, the present transit vehicle wireless transmission broadcast system for wirelessly transmitting multimedia content between transit vehicles for broadcast to passengers traveling within the transit vehicles.

FIG. 1 illustrates the present transit vehicle wireless transmission broadcast system for wirelessly distributing multimedia content between cars on a train having two cars 10 and 20 although the train may include a plurality of interconnected cars. When the transit vehicle includes more than two cars, the multimedia content is transmitted to a receiver in a next car which may or may not be directly adjacent to the transmitter. In this configuration, the transmitter may transmit the multimedia content to a receiver on a car separated from the transmitter by one or more other cars. Still referring to FIG. 1, storage device 12 may include a memory for storing software for operation of the storage device as well as storing the multimedia content and a processor for executing the stored software in accordance with the following description. The storage device may be connected to a closed circuit system 15 for providing audio, video or a combination thereof to the passengers. Alternatively, the multimedia content may be wireless distributed to devices capable of receiving the multimedia content.

The multimedia content may be prerecorded content or may be wirelessly downloaded to the transit vehicle. The multimedia content is illustrated and described as residing in memory within storage device 12, although the multimedia content may be stored on an alternative medium for distribution via a device capable of retrieving the multimedia content from the alternative medium, such as a combination of a storage disk and a disk player. Likewise, the multimedia content may be downloaded to the storage device while the transit vehicle is stationary or while the transit vehicle is traveling.

A converter 13 is connected to the storage device 12 for converting the stored multimedia content to a wireless frequency for transmitting the stored multimedia content via transmitter 14 to receiver 24 located on adjacent car 20. Storage device 12 also distributes the stored multimedia content to video graphic displays 16 and 18 located in first car 10. Receiver 24 located in adjacent car 20 broadcasts the received multimedia content to passengers traveling in adjacent car 20 via video graphic displays 26 and 36 located in adjacent car 20.

Figure 2:
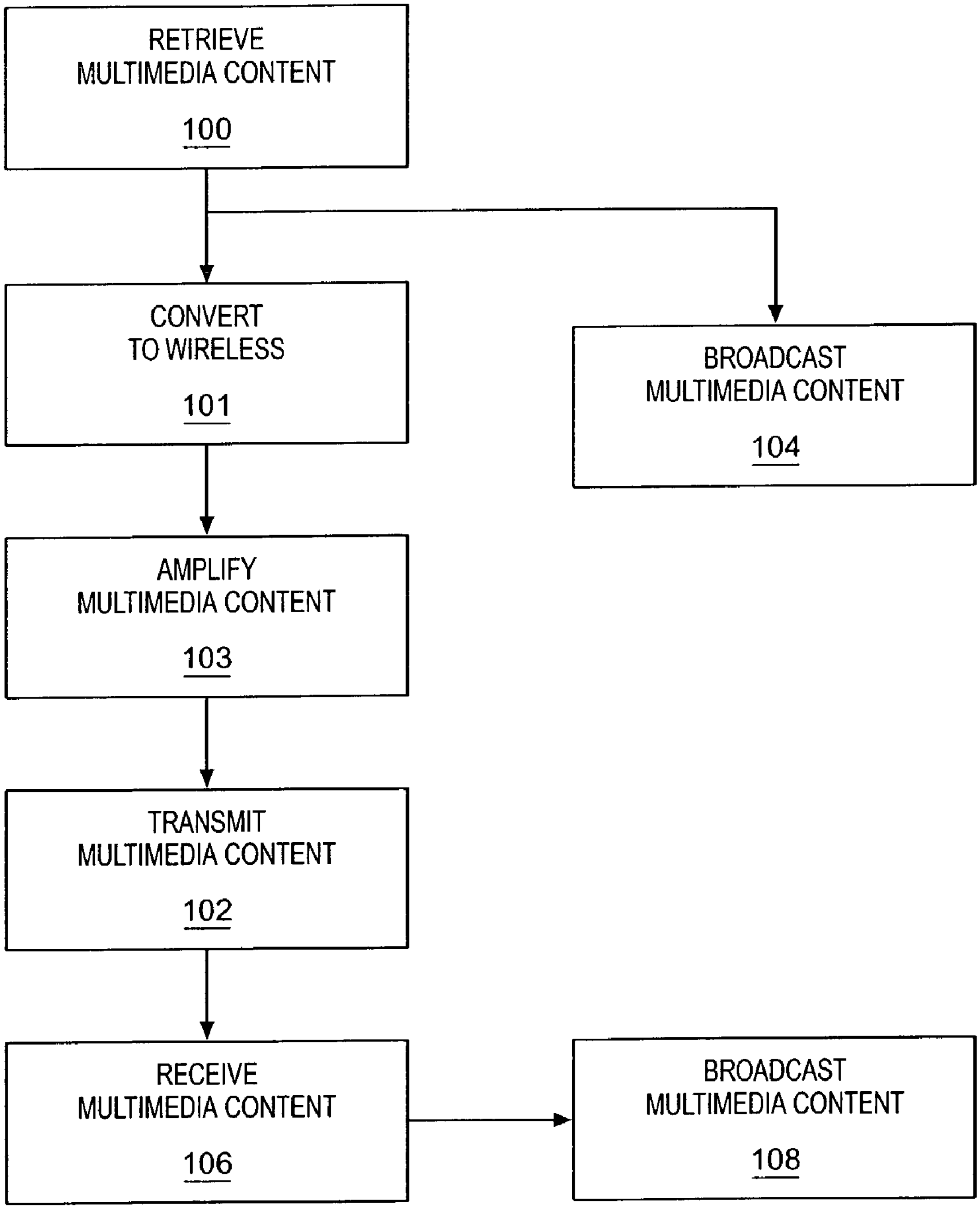
FIG. 2 illustrates a flow diagram of the operation of the broadcast system illustrated in FIG. 1.

Referring to the schematic block diagram of FIG. 1 in conjunction with the flow diagram of FIG. 2, operationally, the multimedia content stored in storage device 12 is retrieved in step 100 and broadcast in step 102 to the passengers traveling in the first car 10 via video graphic displays 16 and 18. The multimedia content retrieved from storage device 12 in step 100 is also converted to a predetermined wireless frequency in step 101 which is transmitted in step 102 to receiver 24 in adjacent car 20. The multimedia content received in step 106 is broadcast in step 108 to passengers traveling in the adjacent car 20.

Figure 3:
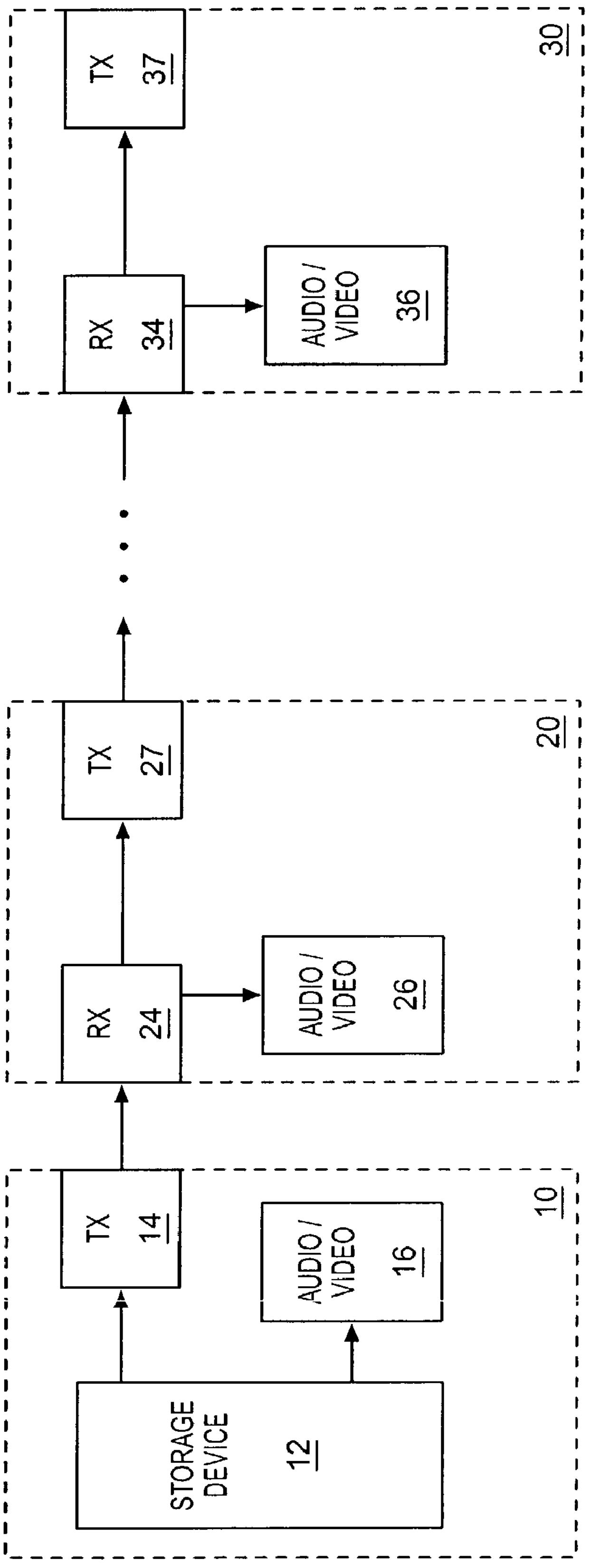
FIG. 3 illustrates in block diagram form, a system for broadcasting multimedia content to passengers traveling in a transit vehicle having a plurality of interconnected cars.
Figure 4:
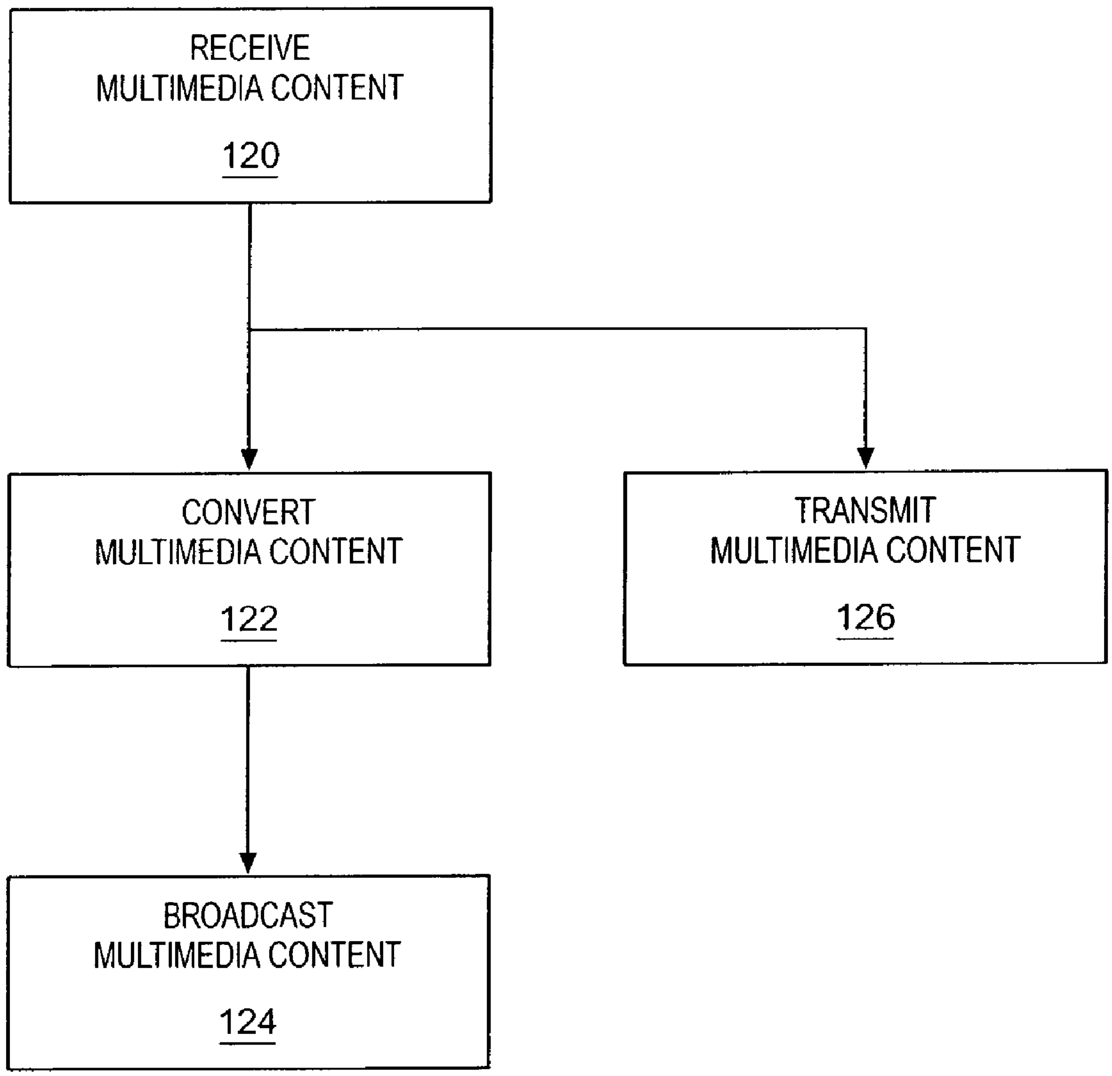
FIG. 4 illustrates a flow diagram of operation of the broadcast system illustrated in FIG. 3.

When a train comprises a plurality of interconnected cars, each adjacent car includes a receiver at one end of the car and a transmitter at the other end of the car 20. Each adjacent car having a receiver and a transmitter provides the components necessary to distribute the multimedia content stored on storage device 12 located in first car 10 to each next adjacent car. Referring to the schematic block diagram of FIG. 3 in conjunction with the flow diagram of FIG. 4, adjacent car 20 wirelessly receives the multimedia content transmitted from first car 10 in step 120. The multimedia content received in step 120 is then transmitted in step 124 to a next adjacent car 30. The multimedia content received in step 120 is also converted to digital format in step 122 and broadcast to passengers traveling within adjacent car 20 in step 124 on video graphic display device 26 located within adjacent car 20. Likewise, the multimedia content received at receiver 34 in next adjacent car 30 is broadcast to passengers traveling within next adjacent car 30 on video graphic display device 36 located within adjacent car 30.

More specifically, each next adjacent car includes a converter 25 for converting the multimedia content step 132 for broadcast on video graphic display 28 located within the car

Figure 5:
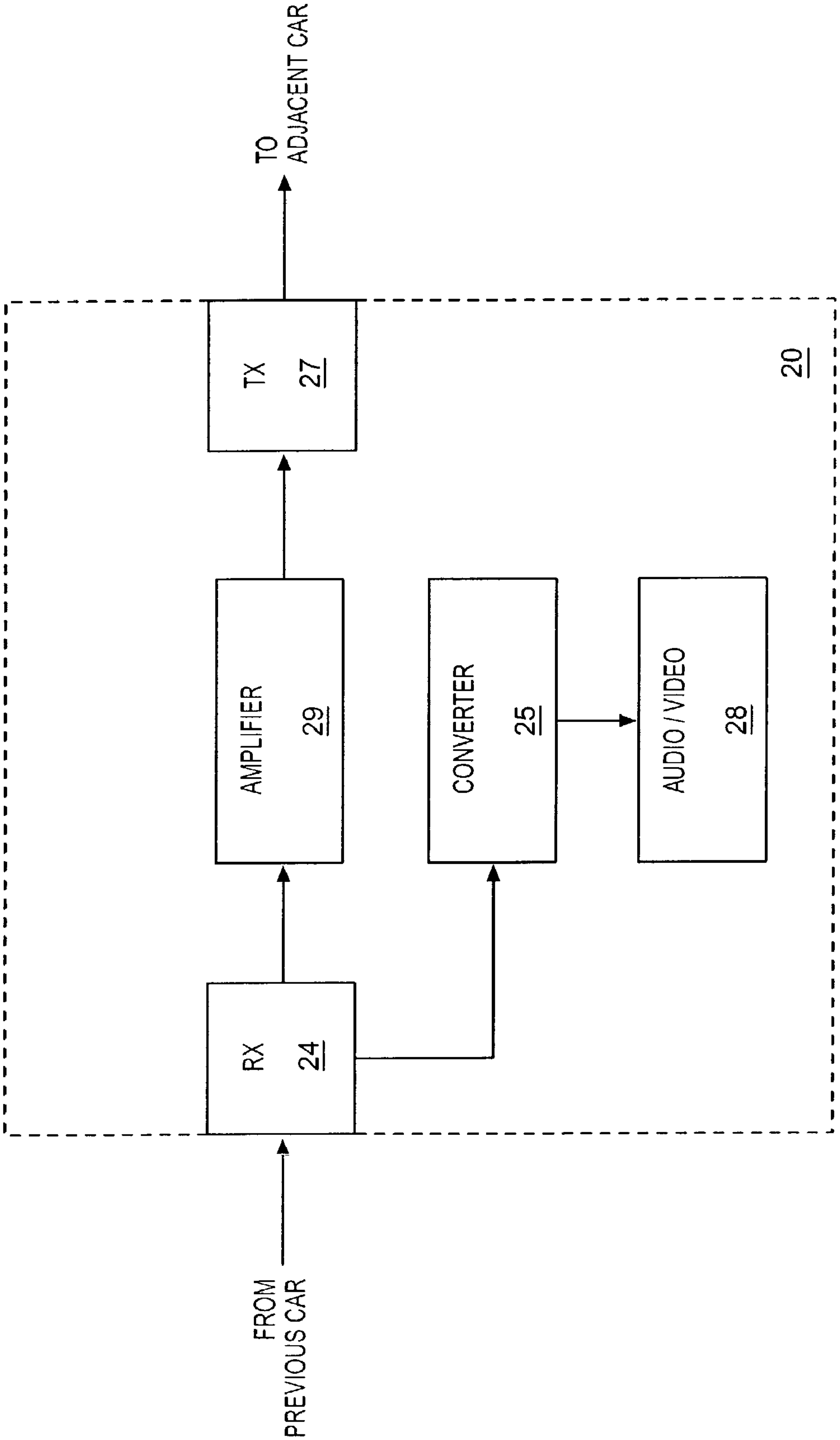
FIG. 5 illustrates in block diagram form, an alternative configuration of the present transit vehicle wireless transmission broadcast system of FIG. 3.
Figure 6:
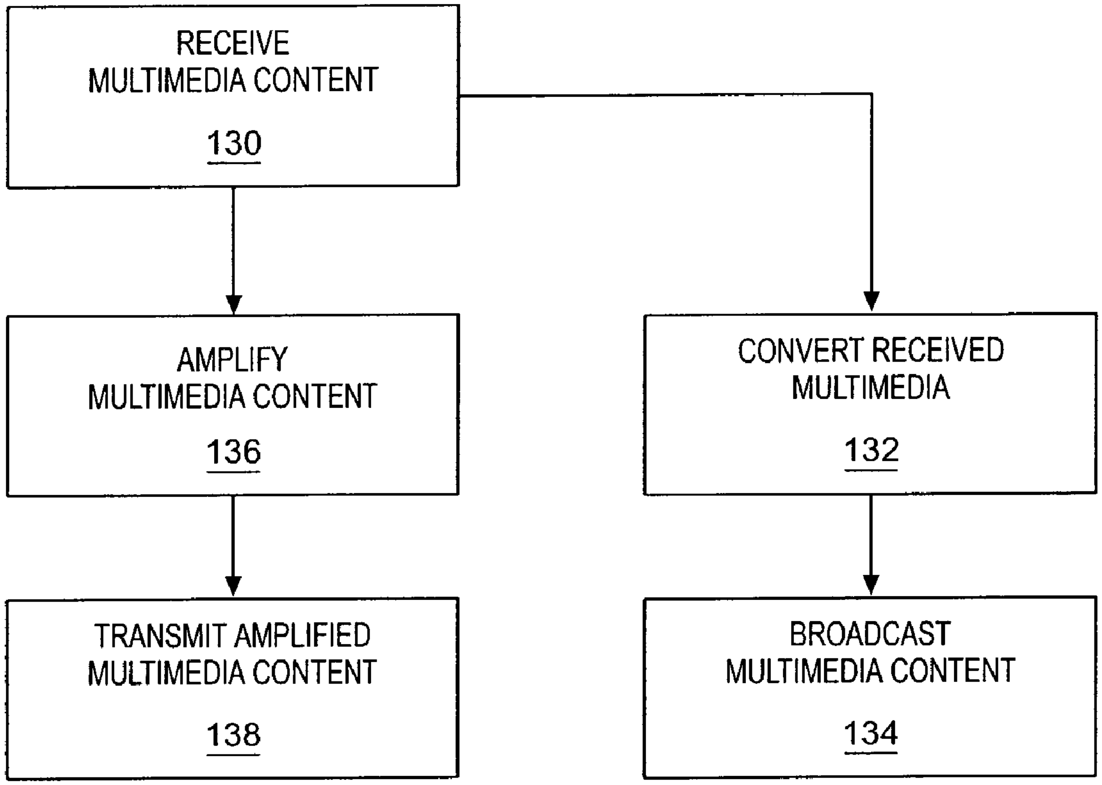
FIG. 6 illustrates a flow diagram of the operation of the system illustrated in FIG. 5.

20 in step 134 as illustrated in FIGS. 5 and 6. Adjacent car 20 may also include a repeater 29, or amplifier, for amplifying the received wireless signal in step 136 prior to transmission of the amplified signal in step 138 to the next adjacent car. Amplifier 29 may be combined with the receiver or the transmitter and may include circuitry to determine whether the received wireless signal requires amplification prior to transmission. Likewise, receiver 24 or video graphic display device 28 may include converter 25 or converter 25 may be a stand along piece of equipment.

Figure 7:
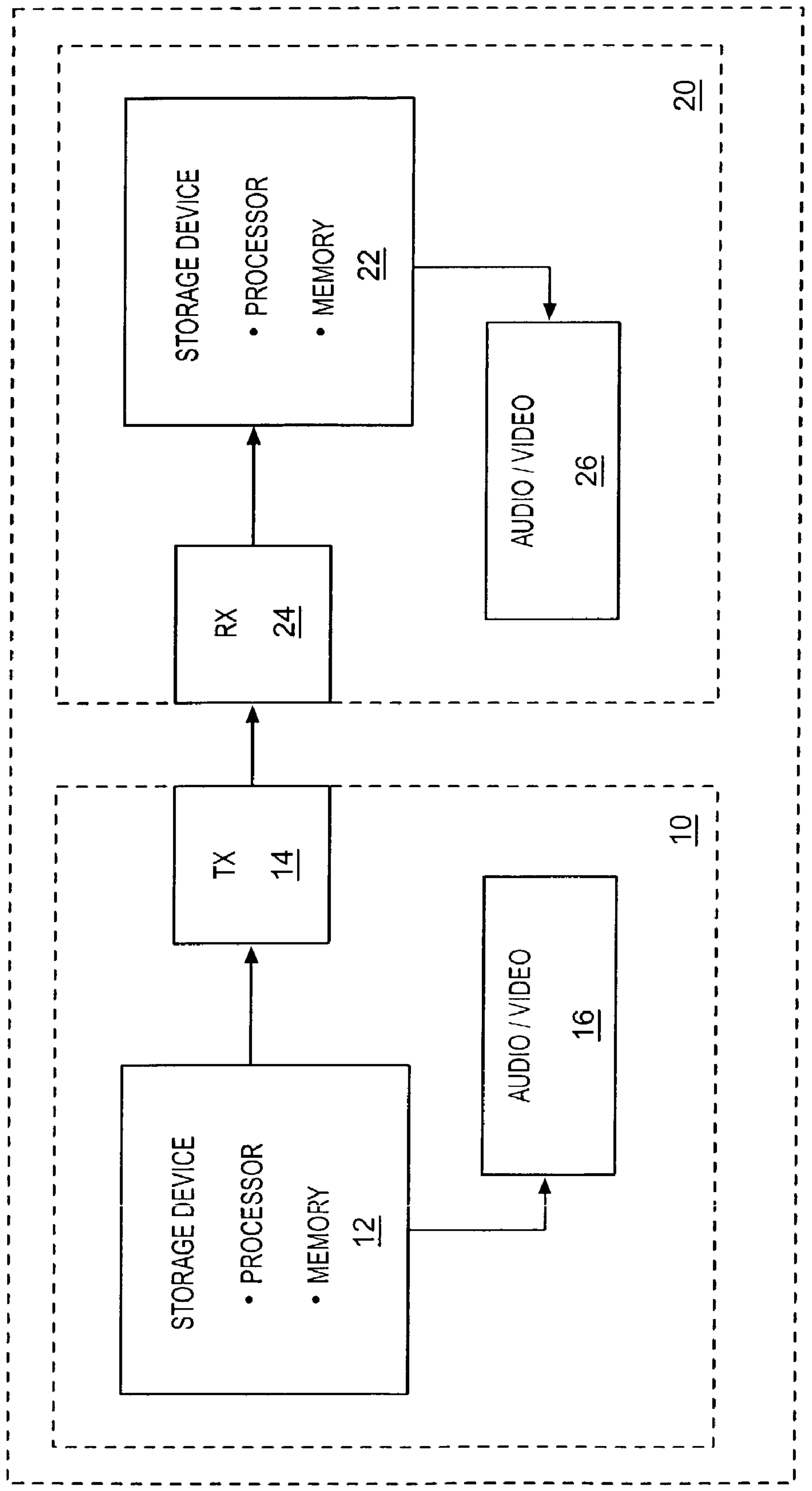
FIG. 7 illustrates in block diagram form, an alternative configuration of the present transit vehicle wireless transmission broadcast system for wirelessly transmitting multimedia content between transit vehicles for broadcast to passengers traveling within the transit vehicles.
Figure 8:
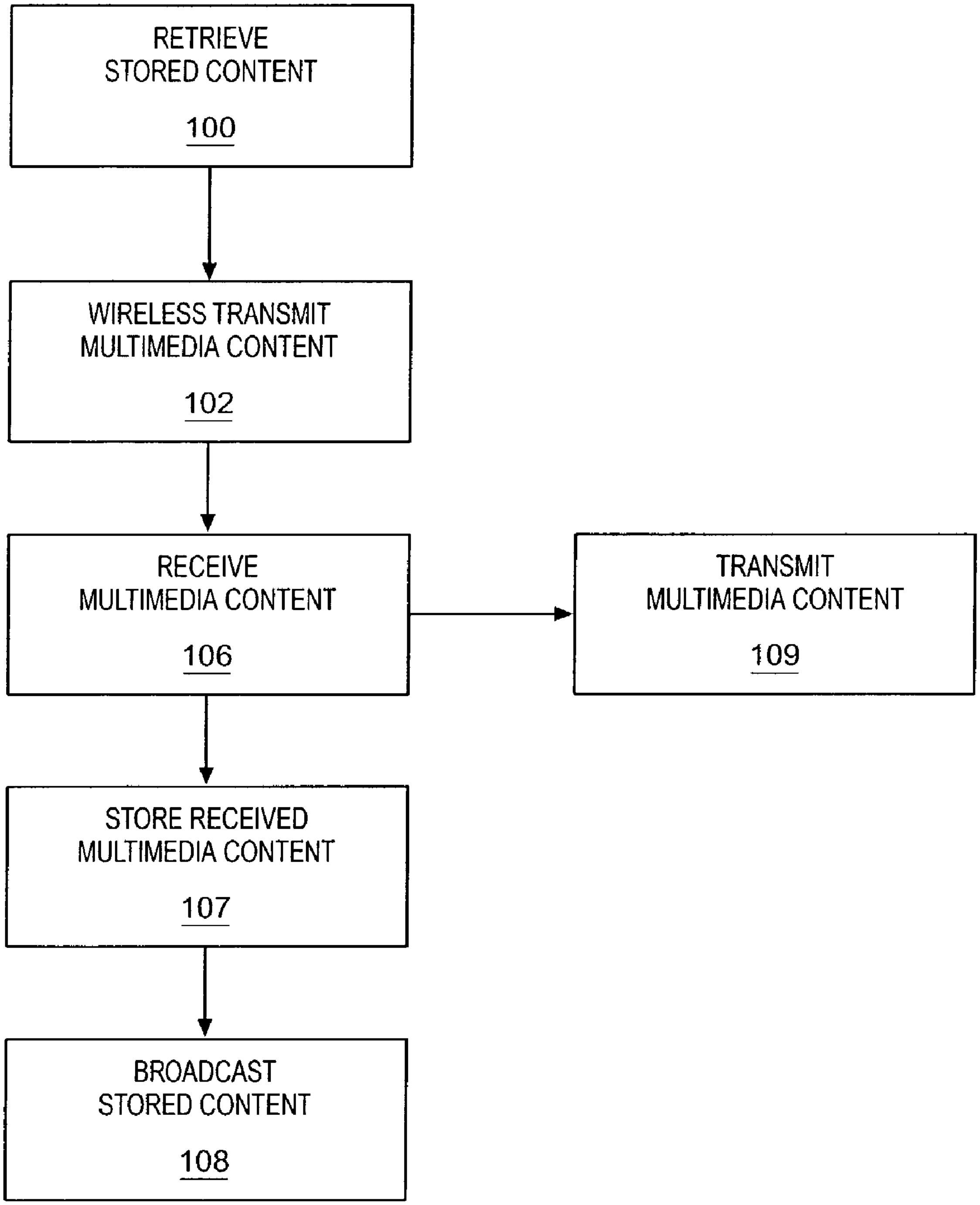
FIG. 8 illustrates a flow diagram of the operation of the broadcast system illustrated in FIG. 7.

In another embodiment illustrated in FIG. 7, each next adjacent car 20 may include a storage device 22 for storing and processing the multimedia content received. In this embodiment, multimedia content transmitted in step 102 from previous car 10 and received in step 106 at adjacent car 20, may be stored in step 107 for later broadcast to passengers in step 108 as illustrated in the flow diagram of FIG. 8. The received multimedia content may also be transmitted in step 109 to a next adjacent car for broadcast or storage. The received multimedia content may be converted to digital format for storage and/or broadcast.

Figure 9:
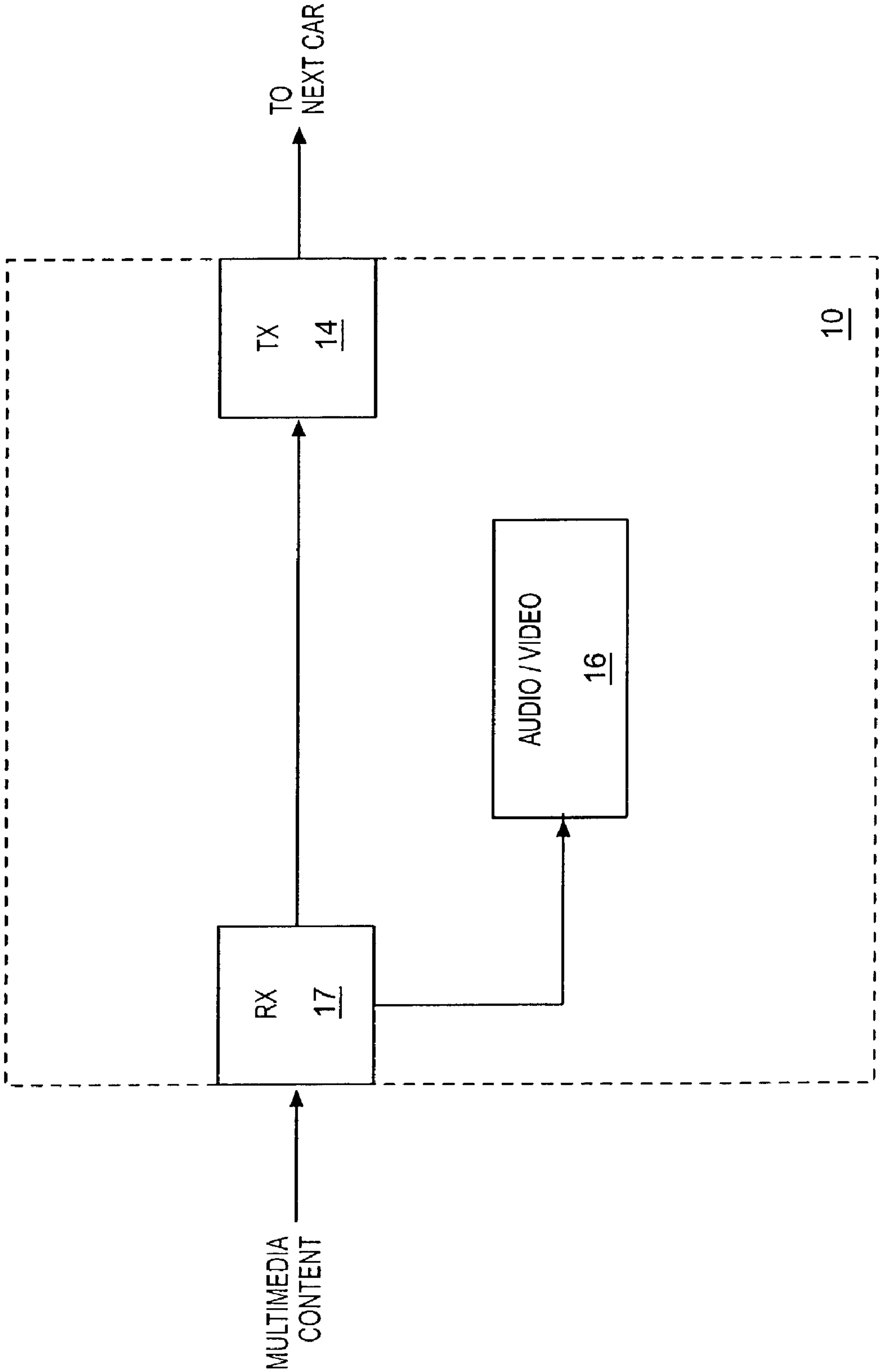
FIG. 9 illustrates in block diagram form, an alternative configuration of the present transit vehicle wireless transmission broadcast system for wirelessly transmitting multimedia content between transit vehicles for broadcast to passengers traveling within the transit vehicles.
Figure 10:
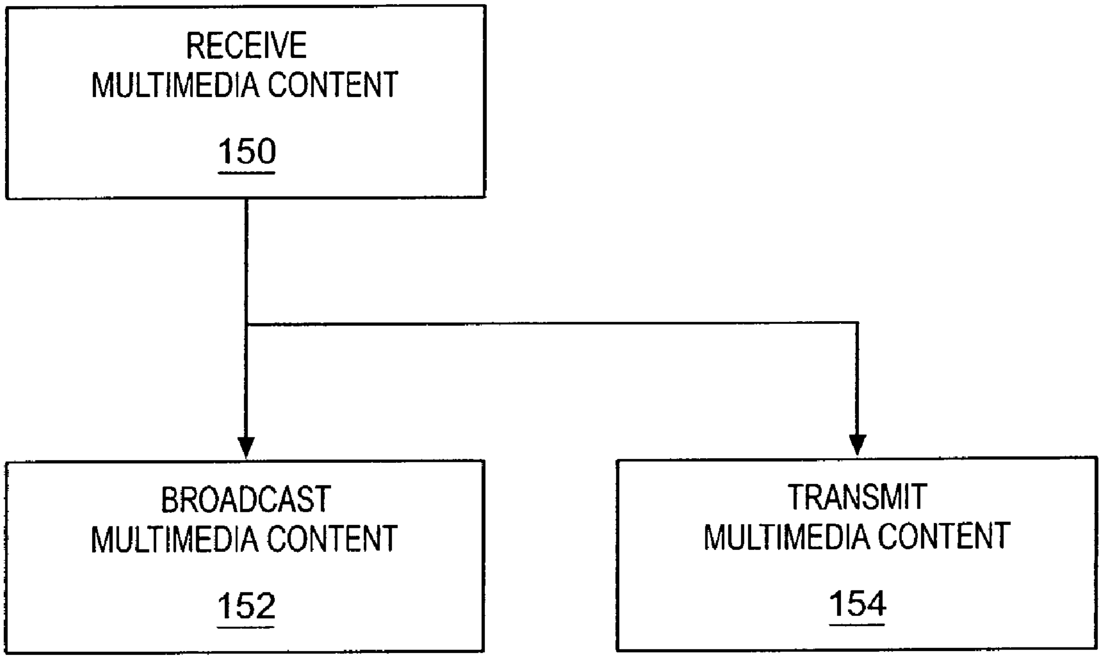
FIG. 10 illustrates a flow diagram of the operation of the broadcast system illustrated in FIG. 9.

In an embodiment illustrated in FIG. 9, multimedia content is downloaded to a receiver 17 in one of the multiple cars 10 and the received multimedia content is transmitted to another car via transmitter 14. In this embodiment, the multimedia content is not stored prior to broadcast to the passengers traveling in the car. Instead, the received multimedia content is broadcast to the passengers. Referring to the flow diagram of FIG. 10 in conjunction with the block schematic diagram of FIG. 9, as the multimedia content is received in step 150, the receiver 17 distributes the received multimedia content. In step 152 the multimedia content is broadcast to passengers and in step 154 the multimedia content is transmitted to another car for broadcast to passengers traveling in that car. As previously discussed, the broadcast to the passengers may be via a closed circuit audio, video or audio/video device, or a combination thereof. Alternatively, the received multimedia content may be wireless transmitted within the car for receipt via wireless devices within the car or in the possession of passengers.

As to alternative embodiments, those skilled in the art will appreciate that the present transit vehicle wireless transmission broadcast system may be implemented with alternative configurations. While the multimedia content has been illustrated and described for broadcast to passengers via video graphic display devices connected to the storage device or to the receiver, alternative configurations may be substituted. For example, the multimedia content may be audio broadcast via speakers within the transit vehicle or may be audio, video or a combination thereof that is wirelessly broadcast for receipt by handheld devices in the possession of passengers that are capable of receiving the wireless multimedia. Similarly, while the multimedia content has been illustrated and described as residing in memory within the storage device, the audio and/or audio/video content may be stored on an alternative medium for distribution via a device capable of retrieving the multimedia content from the alternative medium, such as a combination of a storage disk and a disk player.

It is apparent that there has been described a transit vehicle wireless transmission system that fully satisfies the objects, aims, and advantages set forth above. While the present transit vehicle wireless transmission system has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A transit vehicle broadcast system for broadcasting multimedia content to a plurality of passengers traveling in a transit vehicle having multiple cars, interconnected in predetermined order, the transit vehicle broadcast system comprising:

first means, located in a one of said cars of said transit vehicle, for receiving said multimedia content;

processing means to manage said multimedia content and to distribute and broadcast said multimedia content, comprising;

first storage means, located in a one of said cars of said transit vehicle, for storing said multimedia content;

first means, located in a one of said cars of said transit vehicle, for wirelessly broadcasting said received multimedia content to said plurality of passengers traveling in said one of said cars of said transit vehicle;

converter means connected to said first storage means for converting said multimedia content to a predetermined wireless frequency;

amplifier means for amplifying said converted multimedia content;

a plurality of transmitters, one of said plurality of transmitters located on each of said cars of said transit vehicle for transmitting said converted multimedia content to a next one of said cars of said transit vehicle, interconnected in a predetermined order;

a plurality of receivers, one of said plurality of receivers located on each of said cars of said transit vehicle for receiving said transmitted multimedia content from a previous one of said cars of said transit vehicle; and a plurality of means for broadcasting said multimedia content, at least one of said plurality of broadcasting means connected to said plurality of receivers for broadcasting said multimedia content to said plurality of passengers.

2. A method of operating a transit vehicle broadcast system for broadcasting multimedia content to a plurality of passengers traveling in multiple transit vehicles, the method comprising:

receiving said multimedia content in a one of said multiple transit vehicles;

processing said multimedia content to manage said multimedia content and to distribute and broadcast said multimedia content, comprising:

storing said multimedia content in a data storage device that is located in one of said multiple transit vehicles;

wirelessly broadcasting, from a one of said multiple transit vehicles, said received multimedia content to said plurality of passengers traveling in said one of said multiple transit vehicles;

converting said multimedia content to a predetermined wireless frequency;

amplifying said converted multimedia content;

transmitting said converted multimedia content to a next one of said multiple transit vehicles via a plurality of transmitters, one of said plurality of transmitters being located on each of said multiple transit vehicles;

receiving said transmitted multimedia content from a previous one of said multiple transit vehicles in a plurality of receivers, one of said plurality of receivers being located on each of said multiple transit vehicles; and broadcasting said multimedia content to said plurality of passengers via a plurality of transmitters, said plurality of transmitters being connected to associated ones of said plurality of receivers.

* * * * *

US007139595C1

(12) EX PARTE REEXAMINATION CERTIFICATE (7521st)
United States Patent
Lane

(10) Number: US 7,139,595 C1
(45) Certificate Issued: May 18, 2010

(54) TRANSIT VEHICLE WIRELESS TRANSMISSION BROADCAST SYSTEM

(75) Inventor: David E. Lane, New York, NY (US)

(73) Assignee: CBS Outdoor Group, Inc., New York, NY (US)

Reexamination Request:
No. 90/009,154, May 20, 2008

Reexamination Certificate for:
Patent No.: 7,139,595
Issued: Nov. 21, 2006
Appl. No.: 10/279,444
Filed: Oct. 24, 2002

(51) Int. Cl.
*H04M 1/00* (2006.01)

(52) U.S. Cl. .................... 455/569.2; 455/345; 455/517; 455/99

(58) Field of Classification Search ........................ None
See application file for complete search history.

(56) References Cited

U.S. PATENT DOCUMENTS

| | | | |
|---|---|---|---|
| 4,327,415 | A | 4/1982 | Rush et al. |
| 4,866,515 | A | 9/1989 | Tagawa et al. |
| 4,887,152 | A | 12/1989 | Matsuzaki et al. |
| 4,896,209 | A | 1/1990 | Matsuzaki et al. |
| 4,958,381 | A | 9/1990 | Toyoshima et al. |
| 4,975,696 | A | 12/1990 | Salter, Jr. et al. |
| 5,034,808 | A | 7/1991 | Murray |
| 5,208,590 | A | 5/1993 | Pitts |
| 5,214,505 | A | 5/1993 | Rabowsky et al. |
| 5,220,419 | A | 6/1993 | Sklar et al. |
| 5,289,272 | A | 2/1994 | Rabowsky et al. |
| 5,421,031 | A | 5/1995 | De Bey et al. |
| 5,493,295 | A | 2/1996 | Lewiner et al. |
| 5,524,272 | A | 6/1996 | Podowski et al. |
| 5,555,466 | A | 9/1996 | Scribner et al. |
| 5,600,365 | A | 2/1997 | Kondo et al. |
| 5,610,822 | A | 3/1997 | Murphy |
| 5,617,331 | A | 4/1997 | Wakai et al. |
| 5,666,151 | A | 9/1997 | Kondo et al. |
| 5,701,582 | A | 12/1997 | DeBey et al. |
| 5,717,878 | A | 2/1998 | Sannino et al. |
| 5,732,216 | A | 3/1998 | Logan et al. |
| 5,760,819 | A | 6/1998 | Sklar et al. |
| 5,790,175 | A | 8/1998 | Sklar et al. |
| 5,801,751 | A | 9/1998 | Sklar et al. |
| 5,801,865 | A | 9/1998 | Weis et al. |
| 5,808,660 | A | 9/1998 | Sekine et al. |
| 5,848,367 | A | 12/1998 | Lotocky et al. |
| 5,854,591 | A | 12/1998 | Atkinson |
| 5,896,129 | A | 4/1999 | Murphy et al. |
| 5,907,827 | A | 5/1999 | Fang et al. |
| 5,929,895 | A | 7/1999 | Berry et al. |
| 5,953,429 | A | 9/1999 | Wakai et al. |
| 5,959,596 | A | 9/1999 | McCarten et al. |
| 5,966,442 | A | 10/1999 | Sachdev |
| 5,973,722 | A | 10/1999 | Wakai et al. |

(Continued)

FOREIGN PATENT DOCUMENTS

| | | |
|---|---|---|
| EP | 0357963 | 3/1990 |
| GB | 2306857 | 5/1997 |
| JP | 01138916 | 5/2001 |
| WO | WO-0103075 | 1/2001 |
| WO | WO-0127829 | 4/2001 |
| WO | WO-0137517 | 5/2001 |

OTHER PUBLICATIONS

"Eureka—147—Digital Audio Broadcasting" (Eureka—147 Project, Aug. 1997).*

(Continued)

*Primary Examiner*—Anjan K. Deb

(57) ABSTRACT

A transit vehicle wireless transmission broadcast system for wirelessly transmitting multimedia content from one transit vehicle to another transit vehicle for broadcast of the multimedia content to passengers traveling in the transit vehicles. Each transit vehicle includes a receiver for receiving the multimedia content or storage device for retrieving the multimedia content and a transmitter for wirelessly transmitting the multimedia content to a receiver located on another transit vehicle. Each of the transit vehicles includes broadcast device for broadcasting the multimedia content to the passengers.

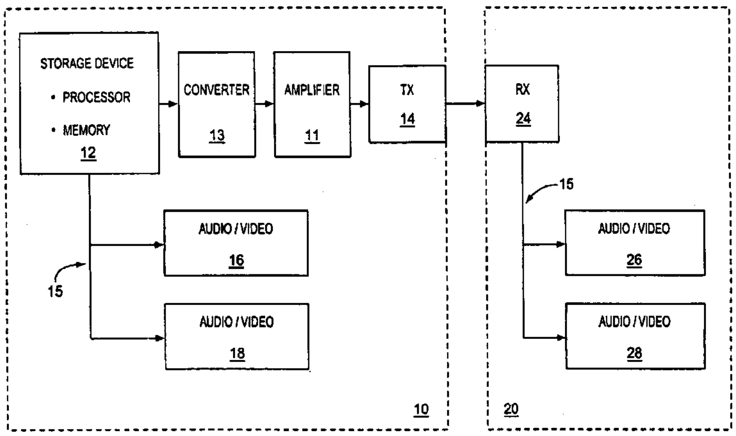

U.S. PATENT DOCUMENTS

| | | | |
|---|---|---|---|
| 5,982,298 | A | 11/1999 | Lappenbusch et al. |
| 5,990,928 | A | 11/1999 | Sklar et al. |
| 6,014,381 | A | 1/2000 | Troxel et al. |
| 6,058,288 | A | 5/2000 | Reed et al. |
| 6,130,626 | A | 10/2000 | Kane et al. |
| 6,144,900 | A | 11/2000 | Ali et al. |
| 6,173,399 | B1 | 1/2001 | Gilbrech |
| 6,177,887 | B1 | 1/2001 | Jerome |
| 6,201,797 | B1 | 3/2001 | Leuca et al. |
| 6,223,027 | B1 | 4/2001 | Ono et al. |
| 6,266,815 | B1 | 7/2001 | Shen et al. |
| 6,335,694 | B1 | 1/2002 | Beksa et al. |
| 6,356,822 | B1 | 3/2002 | Diaz et al. |
| 6,359,571 | B1 | 3/2002 | Endo et al. |
| 6,390,920 | B1 | 5/2002 | Infiesto et al. |
| 6,407,673 | B1 | 6/2002 | Lane |
| 6,490,508 | B2 | 12/2002 | Maruyama et al. |
| 6,512,921 | B1 | 1/2003 | Hadinger |
| 6,529,706 | B1 | 3/2003 | Mitchell |
| RE38,142 | E | 6/2003 | Berry et al. |
| 6,574,338 | B1 | 6/2003 | Sachdev |
| 6,598,227 | B1 | 7/2003 | Berry et al. |
| 6,639,522 | B2 | 10/2003 | Derderian |
| 6,661,353 | B1 | 12/2003 | Gopen |
| 6,741,841 | B1 | 5/2004 | Mitchell |
| 6,745,111 | B2 | 6/2004 | Maruyama et al. |
| 6,748,597 | B1 | 6/2004 | Frisco et al. |
| 6,751,442 | B1 | 6/2004 | Barrett |
| 6,751,801 | B1 | 6/2004 | Frisco et al. |
| 6,807,148 | B1 | 10/2004 | Eicher |
| 6,810,527 | B1 | 10/2004 | Conrad et al. |
| 6,813,777 | B1 | 11/2004 | Weinberger et al. |
| 6,882,290 | B2 | 4/2005 | French et al. |
| 6,884,171 | B2 | 4/2005 | Eck et al. |
| 6,888,443 | B2 | 5/2005 | Ritter et al. |
| 6,958,709 | B2 | 10/2005 | Izbicki et al. |
| 6,961,561 | B2 | 11/2005 | Himmel et al. |
| 6,987,947 | B2 | 1/2006 | Richenstein et al. |
| 6,990,338 | B2 | 1/2006 | Miller et al. |
| 7,020,708 | B2 | 3/2006 | Nelson et al. |
| 7,027,767 | B2 | 4/2006 | de La Chapelle et al. |
| 7,030,753 | B2 | 4/2006 | Hentz et al. |
| 2001/0021654 | A1 | 9/2001 | Spratt et al. |
| 2001/0023499 | A1 | 9/2001 | Wakahara |
| 2001/0048749 | A1 | 12/2001 | Ohmura et al. |
| 2002/0027495 | A1 | 3/2002 | Darby et al. |
| 2002/0049520 | A1 | 4/2002 | Mays |
| 2002/0057212 | A1 | 5/2002 | Hamilton et al. |
| 2002/0087992 | A1 | 7/2002 | Bengeult et al. |
| 2002/0098800 | A1 | 7/2002 | Frazita et al. |
| 2002/0107027 | A1 | 8/2002 | O'Neil |
| 2002/0133825 | A1 | 9/2002 | Rufilanchas et al. |
| 2002/0152468 | A1 | 10/2002 | Parkman |
| 2002/0152470 | A1 | 10/2002 | Hammond |
| 2002/0154055 | A1 | 10/2002 | Davis et al. |
| 2002/0160773 | A1 | 10/2002 | Gresham et al. |
| 2002/0164973 | A1 | 11/2002 | Janik et al. |
| 2002/0170060 | A1 | 11/2002 | Lyman |
| 2002/0178451 | A1 | 11/2002 | Ficco |
| 2003/0023456 | A1 | 1/2003 | Dilollo et al. |
| 2003/0045265 | A1 | 3/2003 | Huang et al. |
| 2003/0046701 | A1 | 3/2003 | O'Donnell |
| 2003/0068999 | A1 | 4/2003 | Casali et al. |
| 2003/0083024 | A1 | 5/2003 | Richenstein et al. |
| 2003/0084451 | A1 | 5/2003 | Pierzga et al. |
| 2003/0085818 | A1 | 5/2003 | Renton et al. |
| 2003/0087638 | A1 | 5/2003 | Taylor |
| 2003/0093798 | A1 | 5/2003 | Rogerson |
| 2003/0114178 | A1 | 6/2003 | Chapelle et al. |
| 2003/0151520 | A1 | 8/2003 | Kraeling et al. |
| 2003/0192052 | A1 | 10/2003 | Frisco et al. |
| 2003/0194967 | A1 | 10/2003 | Sanford et al. |
| 2003/0200547 | A1 | 10/2003 | Frisco et al. |
| 2003/0208764 | A1 | 11/2003 | Galipeau et al. |
| 2003/0217363 | A1 | 11/2003 | Brady et al. |
| 2003/0223387 | A1 | 12/2003 | Davenport et al. |
| 2003/0229897 | A1 | 12/2003 | Frisco et al. |
| 2003/0233658 | A1 | 12/2003 | Keen et al. |
| 2004/0058656 | A1 | 3/2004 | Chikaishi |
| 2004/0066786 | A1 | 4/2004 | Catterall et al. |
| 2004/0077308 | A1 | 4/2004 | Sanford et al. |
| 2004/0078821 | A1 | 4/2004 | Frisco et al. |
| 2004/0098745 | A1 | 5/2004 | Marston et al. |
| 2004/0102216 | A1 | 5/2004 | Rosebrock |
| 2004/0104312 | A1 | 6/2004 | Hess et al. |
| 2004/0119589 | A1 | 6/2004 | French et al. |
| 2004/0139467 | A1 | 7/2004 | Rogerson et al. |
| 2004/0157555 | A1 | 8/2004 | Richtenstein et al. |
| 2004/0181466 | A1 | 9/2004 | Ishida et al. |
| 2004/0219879 | A1 | 11/2004 | Stephenson |
| 2004/0235469 | A1 | 11/2004 | Krug |
| 2004/0259500 | A1 | 12/2004 | Kim |
| 2005/0039208 | A1 | 2/2005 | Veeck et al. |
| 2005/0075783 | A1 | 4/2005 | Wolf et al. |
| 2005/0091110 | A1 | 4/2005 | Hentz et al. |
| 2005/0125151 | A1 | 6/2005 | Lee |
| 2005/0132407 | A1 | 6/2005 | Boyer et al. |
| 2005/0136917 | A1 | 6/2005 | Taylor |
| 2005/0143868 | A1 | 6/2005 | Whelan |
| 2005/0170791 | A1 | 8/2005 | Tabata et al. |
| 2005/0216938 | A1 | 9/2005 | Brady et al. |
| 2005/0256616 | A1 | 11/2005 | Rhoads |
| 2005/0268319 | A1 | 12/2005 | Brady |
| 2005/0273823 | A1 | 12/2005 | Brady et al. |
| 2005/0278753 | A1 | 12/2005 | Brady et al. |
| 2005/0278754 | A1 | 12/2005 | Bleacher et al. |
| 2006/0003689 | A1 | 1/2006 | Griffin et al. |
| 2006/0040612 | A1 | 2/2006 | Min |
| 2006/0068840 | A1 | 3/2006 | Sherman |
| 2006/0107295 | A1 | 5/2006 | Margis et al. |

OTHER PUBLICATIONS

"Mobile and Multimedia–Oriented with the System of the Future," Bosch Research Info, Issue Mar. 1998.

"World Expo 2000: Stroer offers television in the city railway," Author Unknown, http://www.stoeer.de/presse.912.0.html?newsid=131, May 30, 2000.

"MUBIS®—Project Hanover 2000," Author Unknown, http://www.inova–computers.com/turnkey__system__real–time__multi__media__cpu__product.asp?ShowPage=1&TierId=9&Tier2Id=7&Tier3Id=35; Feb. 2000.

"MUBIS®—Project Athens 2004," Author Unknown, http://www.inova–computers.com/turnkey__system__real–time__multi__media__cpu__product.asp?ShowPage=1&TierId=9&Tier2Id=7&Tier3Id=35; Jan. 2003.

"MUBIS®—Project Berlin 2000," Author Unknown, http://www.inova–computers.com/turnkey__system__real–time__multi__media__cpu__product.asp?ShowPage=1&TierId=9&Tier2Id=7&Tier3Id=35; Jul. 2000.

"MUBIS®—Project Flexity Outlook 2004," Author Unknown, http://www.inova–computers.com/turnkey__system__real–time__multi__media__cpu__product.asp?ShowPage=1&TierId=9&Tier2Id=7&Tier3Id=35; Nov. 2003.

"MUBIS®—Project Flexity Classic 2005," Author Unknown, http://www.inova–computers.com/turnkey__system__real–time__multi__media__cpu__product.asp?ShowPage=1&TierId=9&Tier2Id=7&Tier3Id=35; Nov. 2004.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 2 are cancelled.

* * * * *